May 3, 1938.  A. LOEWENSTEIN  2,116,119
SYSTEM FOR ELECTRICALLY MEASURING THE THICKNESS
OF METALLIC WALLS, SHEETS, AND THE LIKE
Filed Oct. 4, 1935  2 Sheets-Sheet 1

INVENTOR

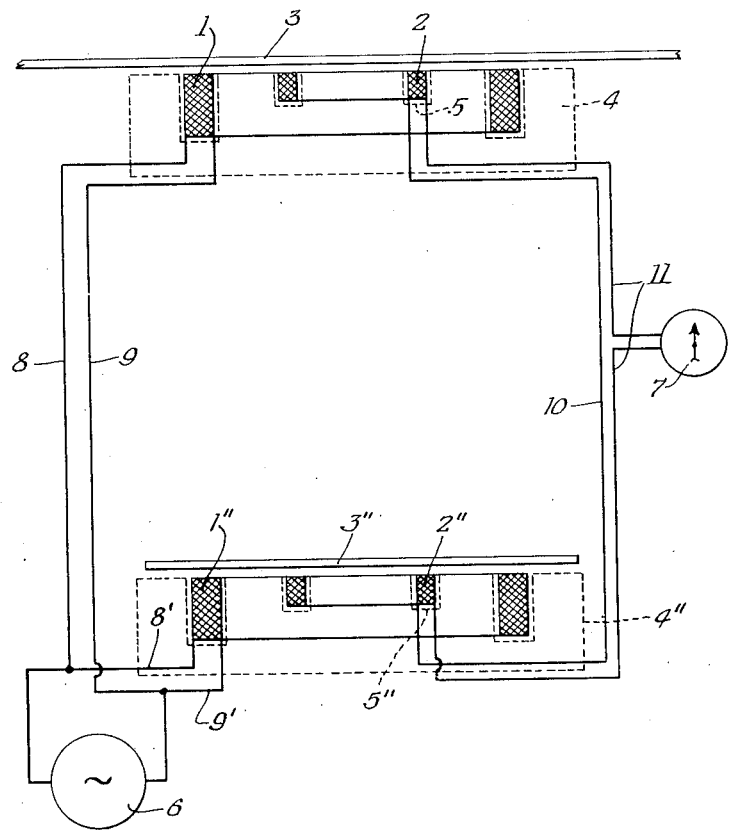

Patented May 3, 1938

2,116,119

UNITED STATES PATENT OFFICE 2,116,119

SYSTEM FOR ELECTRICALLY MEASURING THE THICKNESS OF METALLIC WALLS, SHEETS, AND THE LIKE

Alfred Loewenstein, Jerusalem, Palestine

Application October 4, 1935, Serial No. 43,525
In Great Britain November 21, 1934

13 Claims. (Cl. 175—183)

This invention relates to an automatically operating electric measuring system which is suitable for measuring the thickness of metal sheets or metal walls as well as for finding unevennesses in the material of metal sheets, pipes or other articles of metal.

The invention makes it possible to measure the thickness of rolled sheets during the rolling operation and at any desired point of the sheet width. The system indicates the actual thickness of the sheet at any moment and not the average thickness. The measuring operation can be performed independent of the speed of working of the rolling mill, and at higher speeds than was possible by known methods. The system according to the invention does not obstruct a view of the sheet as it passes from the rolling mill to the winding drum; and it does not take up any substantial room so that it can easily be attached to existing rolling mills.

The measuring device, which is extremely simple both electrically and mechanically, essentially consists of two coils. One of these coils, acting as an induction coil, is connected to a source of alternating current having a constant root mean square value and having the frequency defined hereinafter. In the alternating field produced by the induction coil are positioned the second or measuring coil and the sheet or other thin metal article to be measured (hereinafter referred to as "the sheet"). The alternating field produces in the measuring coil an electromotive force which can be measured, for instance, with the aid of a voltmeter connected thereto. At the same time the alternating field produces in the sheet an electromotive force which causes a circulating or eddy current to flow in said sheet. This current, in turn, produces an alternating field which weakens the primary field. Thus, the electromotive force produced in the measuring coil is modified. The amount of the change in the original field is dependent on the strength of the eddy currents, or in other words, upon the electric resistance of the sheet along the path of the eddy currents and upon the permeability of the sheet material. For the same material the change in the field is thus only a function of the thickness of the sheet. This determines the relation between the thickness of the sheet and the electromotive force induced in the measuring coil.

This principle, which is known in itself, has been developed by the present invention in such a way as to allow highly accurate measurements to be obtained even with the arrangement of the induction and measuring coils on the same side of the sheet, as required in practice.

The arrangement of the coils on different sides of the sheet affords a priori a relatively high sensitivity, since the measuring coil is inductively influenced only by the flux which threads the sheet. This flux may be called the effective flux. If, however, the coils are both arranged on the same side of the sheet, the measuring coil will normally be inductively influenced not only by the effective flux, but also by a certain proportion of that flux which penetrates into the sheet only very superficially or not at all, i. e., by part of the stray flux.

For a constant voltage of the induction coil the total flux remains approximately constant irrespective of variations in the magnetic resistance of the path. Consequently, as the effective flux decreases the stray flux will increase. The sensitivity of the measuring arrangement is, therefore, considerably reduced if the measuring coil is influenced both by the effective flux and by part of the stray flux.

According to the present invention, therefore, the position and size of the measuring coil, which is arranged on the same side of the sheet as the induction coil, are chosen in such a way that the measuring coil is influenced only by the effective flux but not by the stray flux. To this effect, the measuring coil is arranged coaxially with the induction coil and close to the sheet to be measured, and its diameter is made so small that it is threaded only by the central portion of the magnetic flux.

An embodiment of the invention is illustrated by way of example, in Fig. 1 of the accompanying drawings, showing a section through an arrangement for measuring the thickness of plane metal sheets or metal walls.

Fig. 4 is a diagrammatical illustration showing the electric wiring used in a system employing two measuring units.

Figure 1:
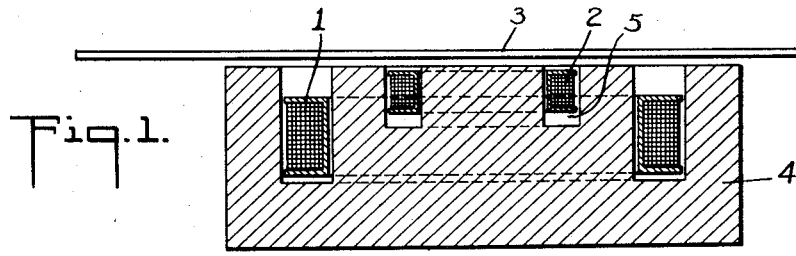

Referring more particularly to Fig. 1, the induction coil 1 and the measuring coil 2 are both coaxially arranged on one side of the sheet 3 or the like to be measured. It will be seen that the measuring coil 2 is arranged at a short distance from the sheet 3 and that its diameter is considerably smaller than that of the induction coil 1.

It can be determined from a diagram showing the distribution of the magnetic flux, what maximum size of the coil is admissible so that it will in no case be affected by the stray flux, as will be explained hereinafter.

In practice, the measuring coil will in most cases be influenced exclusively by the effective flux if the external diameter of this coil is smaller than the diameter of the field produced by the induction coil by an amount which is equal to or greater than four times the distance of the sheet from the induction coil or, in the case of an iron core being used (as hereinafter described), four times the distance of the sheet from the iron core.

If the above conditions for the position and size of the measuring coil are observed, the same sensitivity will be guaranteed for the unilateral arrangement of the coils as has been achieved y positioning the coils on different sides of the sheet.

In addition, however, the invention provides further means for considerably increasing the sensitivity of measurement. As already stated, the currents induced in the sheet cause the inducted flux to be weakened. This weakening is not, however, constant over the whole area. The exact formula for the distribution of the field in such an arrangement is of a form similar to Bessel's cylindrical functions with complex arguments (see Weber & Fischer, Mitteilungen aus dem Kaiser-Wilhelm-Institut für Eisenforschung, Vol. 8, Nr. 10, 1926).

Figure 2:
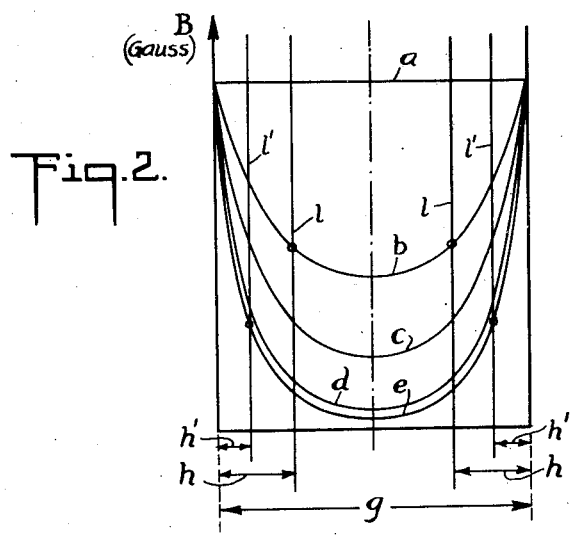
Fig. 2 shows a diagram.

According to this formula, the distribution over a circular cross-section is as illustrated in the diagram, Fig. 2, in which the various values of the field B are shown as ordinates over the internal diameter $g$ of the induction coil as abscissa. The curve $a$ indicates the distribution of the field if no metal sheet is present, and the curves $b$, $c$, $d$ and $e$ show the field distribution when sheets of 0.05 mm., 0.10 mm., 0.20 mm. and 0.30 mm. thickness respectively are present.

It will be seen from Fig. 2 that there is no weakening effect at the periphery of the area threaded by the flux. Progressing inwardly, the flux very quickly decreases from its maximum value, the decrease, for the same frequency, being the more rapid, the thicker the sheet to be measured.

If, accordingly, the total circular area threaded by the flux is subdivided into an external annulus and an internal circular area, the annulus is threaded by a flux which is only slightly influenced by the sheet, whilst the interior circular area has a flux which is greatly dependent on the thickness of the sheet. Consequently, a further considerable increase in sensitivity is achieved if the measuring coil is influenced only by this central flux.

Fig. 2 shows, in addition to the curves $a$ to $e$ of the field distribution, the "depth of penetration" $h$, $h^1$, for sheets of 0.05 and 0.30 mm. thickness. This "depth of penetration" is defined as follows:—In the sheet a certain amount (although very little) of electrical energy is transformed into heat owing to the induced currents. If, instead of considering the actual conditions, it is assumed that the same current density as that actually prevailing in the periphery of the area threaded by the flux, prevails throughout the cross-sectional area of a short hollow-cylinder of a height equal to the thickness of the sheet, then the depth of penetration would represent the wall thickness of that hollow-cylinder in which the same amount of energy is transformed into heat as is in reality transformed in the whole sheet (or in other words, in a solid cylinder of the same external diameter), if the actual distribution of flux is taken into account. Expressed otherwise, the depth of penetration is the wall-thickness of a hollow-cylinder with a uniformly distributed flux of the same total value as the total flux in the actual sheet.

In the first approximation, the depth of penetration $\delta$ can be considered to be $$\delta = 500\sqrt{\frac{\rho}{f.\mu.s}}(mms.)$$

wherein $\rho$ is the specific resistance of the sheet material in $$\frac{\Omega \cdot mm^2}{m}$$

$s$ is the thickness of the sheet in mms., $\mu$ its permeability, and $f$ the frequency of the induced current.

As will be seen from Fig. 2, the curves $b$ and $e$ of the field distribution intersect the straight lines $l$, $l^1$ representing the depths of penetration, near the points of greatest curvature. Outside the lines $l$, $l^1$ is situated the annular region of smaller dependence of the flux on the sheet thickness, and inside these lines is situated the region of maximum dependence and sensitivity. According to the invention, the measuring coil is influenced only by the flux inside the space surrounded by the "depth of penetration". The radius $r_m$ of the measuring coil must therefore be $$r_m \leq r_i - \delta$$

wherein $r_i$ is the inner radius of the induction coil and $\delta$ is the depth of penetration, in mms., defined above.

The aim of attaining the smallest possible dimensions of the apparatus, together with the consideration of the winding space required, for the two coils, results in the following rule of construction for the depth of penetration:—

$$\delta \leq 10 \ mms.$$

With the aid of the first mentioned formula for $\delta$, the frequency $f$ at which the apparatus should be worked can be found to be $$f \geq 2500 \frac{\rho}{\mu \cdot s} \ per \ second,$$

wherein $\rho$, $\mu$, and $s$ are respectively the specific resistance, the permeability and the thickness of the metal sheet, as defined above.

The magnitude of the stray flux can be influenced by varying the shape and position of the induction coil. If the latter is arranged as close, or substantially as close, to the sheet as the measuring coil and if its diameter is considerably greater than its height, as shown, the proportion of the stray flux in the total flux will be small. A considerably increased proportion of the flux can then be utilized for influencing the measuring coil.

If the induction coil is arranged near the sheet, the further advantage is achieved that a larger proportion of the flux threading the sheet will pass through the latter perpendicularly or almost perpendicularly. Consequently, the sheet will be positioned in a region of the least curvature of the lines of force and it follows therefrom that slight variations in the distance between the sheet and coils will have hardly any noticeable effect upon the results of the measuring operations.

The amount of space necessary for the windings depends to a great extent on the number of ampere-turns required. This number can be largely reduced by the use of a laminated iron core which may be of the construction shown in Fig. 1. This iron core 4 surrounds the induction coil 1 almost completely and is provided with a recess 5 for measuring coil 2.

As the electromotive force in the measuring coil 2 is produced by transformation of the electromotive force in the primary coil 1, the results will also depend on the voltage applied to this latter coil. The voltage must therefore be kept constant. By the application of a differential system, however, the apparatus can be made independent of the primary voltage. Thus, for instance, the induction coils of two similar measuring systems may be connected in parallel and the two measuring coils may be oppositely connected. If then one of the systems is accurately adjusted for the standard sheet thickness by using a sheet of exactly this thickness, and if the actual thickness of the sheet to be examined is measured with the aid of the second system, an indicating instrument connected in the circuit of the two measuring coils will only indicate the deviations from the standard thickness of the sheet.

An arrangement of this kind is diagrammatically illustrated in Fig. 4. In this embodiment of the invention, there are provided a metal sheet 3 to be examined and a second or standard sheet 3'', each sheet having associated therewith an induction coil 1, 1'' and a measuring coil 2, 2'', said coils being positioned in recesses 5, 5'' of iron cores indicated at 4, 4''. The induction and measuring coils of each sheet are arranged at equal distances from and in relatively close proximity to their respective sheets. A generator 6 or other source of inconstant or variable voltage is connected with the two induction coils 1, 1'' by parallel circuits respectively comprising pairs of wires 8, 9 and 8', 9'. The two measuring coils 2, 2'' are interconnected in opposed relationship in a circuit which also includes a measuring instrument, as indicated at 7. It will be noted that a wire 10 connects the inner end of coil 2 with the inner end of coil 2'' while a conductor 11 including the instrument 7 connects the outer end of coil 2 with the outer end of coil 2''.

Figure 3:
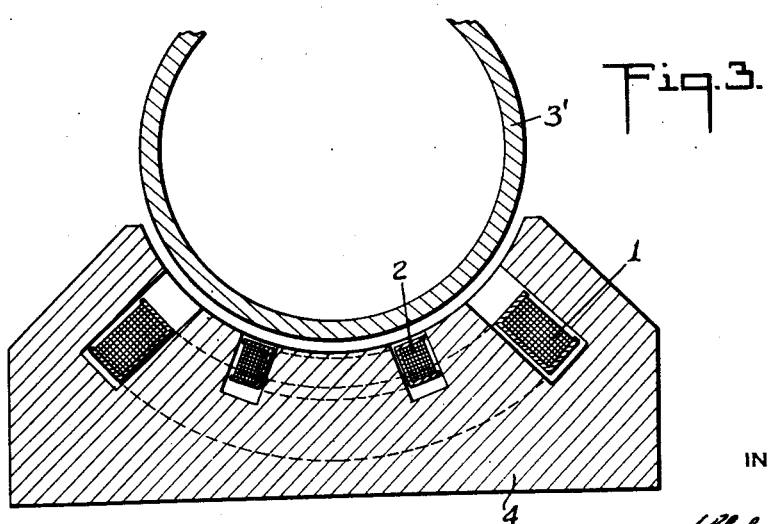
Fig. 3 shows a second embodiment of the invention adapted for measuring the thickness of tube walls or other curved metal plates.

With the aid of two systems interconnected in the manner indicated above, it is possible to find differences in the thickness of metallic walls, faulty parts in pipes, and the like. In the case of pipes having to be measured, two apparatus of a construction such as illustrated, by way of example, in Fig. 3 are placed against the pipe 3¹ at a suitable distance apart. The pipe may be slowly rotated. If one of the systems encounters a faulty pipe portion, this becomes apparent at once by the indication of the measuring instrument.

I claim:—

1. A system for electrically measuring the thickness of metal sheets, ascertaining faults in metallic walls, and the like purposes, comprising a first or induction coil adapted to be connected to a source of current of periodically varying voltage and adapted to be arranged in the vicinity of one surface of the article to be examined or measured so as to produce an electromagnetic field comprising an outer annular area of flux not completely threading the thickness of said article and an inner area of flux completely threading said article, a second or measuring coil adapted to be positioned on the same side of said article as said induction coil and substantially entirely within said inner area of flux, and a current indicator operatively connected to said measuring coil.

2. A system of electrically measuring the thickness of metal sheets, ascertaining faults in metallic walls, and the like purposes, comprising a first or induction coil adapted to be connected to a source of current of periodically varying voltage and adapted to be arranged in the vicinity of one surface of the article to be examined or measured so as to produce an electromagnetic field including flux completely threading the thickness of said article, a second or measuring coil adapted to be positioned on the same side of said article as said induction coil and substantially entirely within the zone of influence of said flux, and a current indicator operatively connected to said measuring coil.

3. A system for electrically measuring the thickness of metal sheets, ascertaining faults in metallic walls, and the like purposes, comprising a first or induction coil adapted to be connected to a source of current of periodically varying voltage and adapted to be arranged in the vicinity of one surface of the article to be examined or measured so as to produce in said article an electromagnetic flux of non-uniform distribution, a second or measuring coil adapted to be positioned on the same side of said article as said induction coil and substantially entirely within the zone of influence of said flux, and a current indicator operatively connected to said measuring coil, said measuring coil having an external diameter not substantially greater than the diameter of a central area of said article which would be free of flux if the total actual flux produced in said article were uniformly distributed within an annular zone, bounded by the inner diameter of said induction coil and by said central area, and at a density equal to the actual density of the flux at the periphery of the area threaded by the actual flux.

4. A system as claimed in claim 2 wherein said current of periodically varying voltage is alternating current having a frequency $f$ determined by the formula $$f \geq 2500 \frac{\rho}{\mu \cdot s}$$

wherein $\rho$ is the specific resistance of the material of said article in ohm square millimeters per meter, $\mu$ the permeability of said material, and $s$ the average or standard thickness of said article in millimeters.

5. A system as claimed in claim 1 wherein said induction coil has a diameter substantially greater than its axial height, said measuring coil being arranged coaxially within said induction coil.

6. A system for electrically measuring the thickness of metal sheets, ascertaining faults in metallic walls, and the like purposes, comprising a laminated iron core adapted to be positioned with one end face thereof in the vicinity of one surface of the article to be examined or measured and having said end face formed with two concentric annular recesses, a first or induction coil positioned within the outer one of said recesses and adapted to be connected to a source of current of periodically varying voltage so as to produce an electromagnetic field including flux threading said article, a second or measuring coil positioned within the inner one of said recesses, and a current indicator operatively connected to said measuring coil.

7. A system as claimed in claim 6 wherein said end face of the iron core is shaped to conform with the contour of the adjacent surface of said article.

8. A system as claimed in claim 6 wherein the distance between the inner periphery of said outer recess and the outer periphery of said inner recess is equal to or greater than twice the distance between said end face of the iron core and the adjacent surface of said article.

9. A system as claimed in claim 2 wherein the distance between the inner periphery of said induction coil and the outer periphery of said measuring coil is equal to or greater than twice the distance of one of said coils from the surface of said article.

10. A system for electrically measuring the thickness of metal sheets, ascertaining faults in metallic walls, and the like purposes, comprising a coil adapted to be connected to a source of current of periodically varying voltage and to be arranged in the vicinity of one surface of the article to be examined or measured so as to produce an electromagnetic field including flux completely threading the thickness of said article, a second coil adapted to be positioned on the same side of said article as said first named coil and within said field, a third coil connected to said source of current so as to produce a second field of electromagnetic flux, a metallic object having approximately the same thickness as said article and adapted to be positioned with one surface thereof in the vicinity of said third named coil, a fourth coil adapted to be positioned within said second field, and a current indicator operatively connected with said second and fourth named coils in such a manner as to indicate current differences between said second and fourth named coils.

11. A system for electrically measuring the thickness of metal sheets, ascertaining faults in metallic walls, and the like purposes, comprising a coil adapted to be connected to a source of current of periodically varying voltage and to be arranged in the vicinity of one surface of the article to be examined or measured so as to produce an electromagnetic field comprising an outer annular area of flux not completely threading the thickness of said article and an inner area of flux completely threading said article, a second coil adapted to be positioned on the same side of said article as said first named coil and substantially entirely within said inner area of flux, a third coil connected to said source of current so as to produce a second field of electromagnetic flux, a metallic object having a thickness equal to the average or standard thickness of said article and adapted to be positioned with one surface thereof in the vicinity of said third named coil, a fourth coil adapted to be positioned within said second field, and a current indicator operatively connected with said second and fourth named coils in such a manner as to indicate current differences between said second and fourth named coils.

12. A system for electrically measuring the thickness of metal sheets, ascertaining faults in metallic walls, and the like purposes, comprising an iron core adapted to be positioned with one end face thereof in the vicinity of one surface of the article to be examined or measured and having said end face formed with two concentric annular recesses, a coil positioned within the outer one of said recesses and adapted to be connected to a source of current of periodically varying voltage so as to produce an electromagnetic field including flux threading said article, a second coil positioned within the inner one of said recesses, a second iron core having one end face thereof formed with two concentric annular recesses, a metallic object having a thickness equal to the average or standard thickness of said article and adapted to be positioned with one surface thereof in the vicinity of said end face of said second named iron core, a third coil connected to said source of current and positioned within the outer recess of said second named iron core, a fourth coil positioned within the inner recess of said second named iron core, and a current indicator operatively connected with said second and fourth named coils in such a manner as to indicate current differences between said second and fourth named coils.

13. A system as claimed in claim 1 wherein the induction coil is positioned substantially as close to said article as the measuring coil.

ALFRED LOEWENSTEIN.